United States Patent [19]

Wenzel et al.

[11] 3,751,214
[45] Aug. 7, 1973

[54] METHOD OF AND APPARATUS FOR CONVEYING GRANULAR MASSES IN TUBULAR TREATING CHAMBERS

[75] Inventors: Werner Wenzel; Friedrich H. Franke; Mohammed Meraikib, all of Aachen, Germany

[73] Assignees: Rheinische Braunkohlenwerke AG, Cologne; Werner Wenzel, Aachen, both of Germany

[22] Filed: Apr. 2, 1971

[21] Appl. No.: 130,701

[30] Foreign Application Priority Data
Apr. 2, 1970   Germany.................. P 20 15 791.9

[52] U.S. Cl..................... 432/15, 302/26, 432/58, 302/17, 432/112, 34/10, 34/57 R
[51] Int. Cl............................................. B65g 53/04
[58] Field of Search..................... 34/10, 57 R, 57 B; 263/21 R, 21 A; 302/17, 52, 59, 26; 432/15, 58, 112

[56] References Cited
UNITED STATES PATENTS
3,117,064   1/1964   Friedrich ............................ 432/15
2,871,004   1/1959   Gorin................................. 432/15
1,308,464   7/1919   Westly................................ 302/26

Primary Examiner—John J. Camby
Assistant Examiner—Henry C. Yuen
Attorney—Edwin E. Greigg

[57] ABSTRACT

Solid fuel, such as granular raw brown coal, is moved through an approximately horizontally disposed tubular heat treating chamber (reaction tube) by means of a carrier fluid, the flow of which is periodically interrupted or at least decreased by periodically closing a fluid discharge valve disposed downstream of the reaction tube. During the closed periods of the valve, at least one part of the granular material settles in the tube and, when the valve is opened, the matrial is rendered turbulent by the initial thrust of the carrier fluid as the latter resumes its periodic effective flow.

14 Claims, 2 Drawing Figures

PATENTED AUG 7 1973

3,751,214

INVENTORS
Mohammed Meraikib
Werner Wenzel &
BY Friedrich H. Franke

Edwin E. Greigg

3,751,214

METHOD OF AND APPARATUS FOR CONVEYING GRANULAR MASSES IN TUBULAR TREATING CHAMBERS

BACKGROUND OF THE INVENTION

This invention relates to the transport of a granular mass in a reaction tube in which said mass is submitted to a heat treatment by virtue of the externally heated hot tube walls.

In known heat treating apparatuses of the aforeoutlined type, the granular mass is moved within the tubes by mechanical conveying means, such as worms, chains, and the like, or, the tube is disposed at an angle to the horizontal and is rotated about its horizontal axis or an axis intersecting the latter. It has also been proposed to move the granular mass through the tube by means of a fluid carrier.

These known means for moving the granular mass through the reaction tube have various disadvantages which exclude, or at least make difficult, their use in a number of important processes. These difficulties reside in the fact that on occasions the necessary mechanical equipment for conveying the granular mass through tubes is too complex or requires too much space to be usable in the relatively small-diameter reaction tubes. The difficulty in using a conveying fluid medium, such as a gas or a liquid, lies in the necessity of driving the fluid medium with relatively large speeds, in order to prevent, particularly in case of carrier gases, the granular material from settling on the inner wall of the tubes.

The invention is based on a method and apparatus for the transport of a granular mass in horizontal or slightly inclined tubes or tubular sections in which a gaseous or liquid conveying medium is used.

OBJECTS, SUMMARY AND ADVANTAGES OF THE INVENTION

It is an object of the invention to provide an improved method and an apparatus for the aforeoutlined type wherein the known disadvantages and difficulties are eliminated.

It is also an object of the invention to provide an improved method and an apparatus of the aforeoutlined type wherein the dwelling time of the granules in the reaction tube may be arbitrarily controlled.

Briefly stated, according to the invention, the advancing speed of the fluid carrier is caused to periodically alternate between a high and a low value in such a manner that during the low-speed fluid advance, the granular mass settles partially or entirely on the tube wall, whereas during the high-speed fluid flow, it is entirely or substantially in its entirety carried away by the fluid medium.

It is an advantage of the aforenoted method that the granular mass may be conveyed through long tubes without taking addtional steps to obtain such result. It is a further advantage that larger granules have a longer dwelling time in the reaction tube than smaller ones. In this manner there is an automatic matching of the conveying speed with the duration of dwelling time during which the granules, as a function of their size, have to be exposed to the heat treatment in the reaction tube.

The invention will be better understood, as well as further objects and advantages will become more apparent, from the ensuing detailed specification of a preferred, although exemplary, embodiment of the invention taken in conjunction with the drawing.

GENERAL CHARACTERISTICS OF THE METHOD ACCORDING TO THE INVENTION

Figure 1:
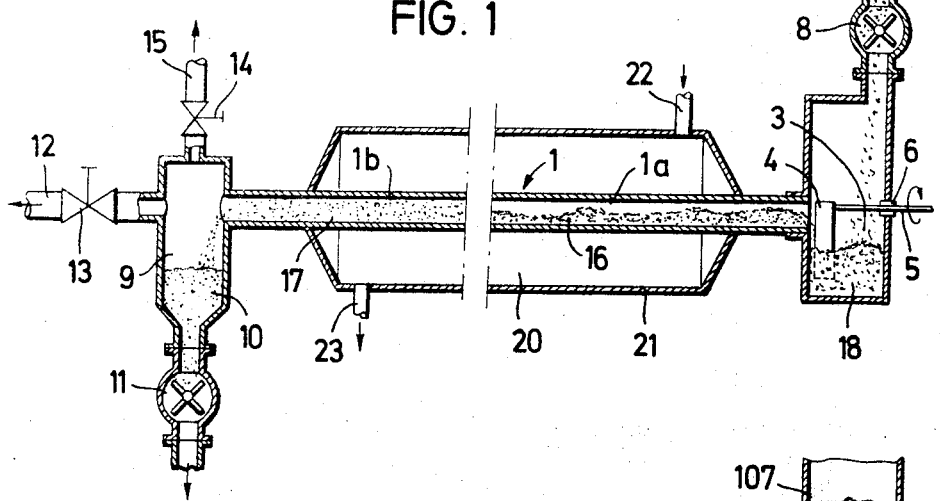
FIG. 1 is a schematic side elevational view of the preferred embodiment including a horizontally arranged reaction tube and FIG. 2 is a schematic side elevational view of the same embodiment including a slightly inclined reaction tube.

The speed of the carrier fluid passing through the reaction tube may be altered, for example, by periodically interrupting the entry of the fluid into the tube. It is also feasible to periodically interrupt the outflow of the carrier fluid at the discharge end of the tube.

It has been found to be particularly advantageous — for reasons given hereinafter — to reduce the speed of the carrier fluid slowly, but to increase its speed rapidly. In this manner the resumption of the fluid flow starts with a thrust. For this purpose, at the charging end of the tube where the granular mass to be treated is introduced, there may be provided an inlet controlling means for the conveying fluid. This control means is periodically opened and closed (fully or partially) in such a manner that the opening occurs relatively rapidly and a relatively large flow passage section is made available for the fluid medium so that, as mentioned hereinbefore, the medium may resume its travel through the tube with an initial thrust in the direction of its discharge end. Such an initial thrust causes a sudden turbulence and thus a spontaneous stirring of the granular mass which is subsequently carried by the fluid medium in the direction of the discharge end of the tube. After a short while the inlet control means is again closed, at least to such an extent that the granular mass or at least a desired or determinable quantity thereof again settles on the tube walls while another, fine-grain portion of the granular mass, is displaced by the slow-flowing carrier fluid.

According to a further embodiment of the novel method, the carrier fluid is introduced into the tube continuously or intermittently at one or more locations and at the discharge end of the tube there is provided, for controlling the outlet of the carrier fluid, a valve means, such as a gate or a plug, which is intermittently opened and closed. During the closed condition of the valve means, in the reaction tube a pressure buildup takes place which, upon opening of the valve means, leads to the thrustlike resumption of the rapid fluid flow from the charging end of the tube to the outlet end thereof. It is expedient to operate the inlet control means for the carier fluid synchronously with the valve means therefor at the outlet end of the reaction tube. In general, it is sufficient if the inlet valve is maintained continuously open with a relatively small flow passage section so that during the closed condition of the outlet valve means a slow buildup of pressure may take place in the reaction tube.

An important field of application of the method according to the invention is in vaporizing processes, gasification processes and chemical reactions for granular masses which for these purposes are to be heated in a tubular system. The aforenoted or similar processes may take place in the same tube in succession or in an overlapping manner.

As the raw material, such as water-containing granular raw brown coal, is introduced by a charging mechanism into the reaction tube, it is first thoroughly dried by the heat applied by the tube wall. As a result, water vapor escapes from the raw material and serves as the carrier fluid for transporting the material in the reaction tube. Subsequent to the drying of the raw brown coal, the dry coal is, by virtue of further heating, gasified whereby further conveying gases are generated. As the dry coal is conveyed according to the invention, it is eventually heated by the tubular walls to such an extent that it reacts with the water vapor constituting the conveying medium and with the carbon dioxide obtained from the gasification of the coal and thereby combustible gases are generated.

According to the invention, the coal periodically settles in the tube as the carrier fluid slows down. In this manner the granules contact the hot tube wall, and, as a result, an intensive heating thereof occurs. By virtue of the subsequent stirring of the coal caused by the opening of the outlet means for the carrier gas, the coal heated to the greatest extent in the vicinity of the tube wall will vigorously contact the water vapor and the carbon dioxide to thus induce the desired gasification reactions. Upon the resettling of the solid granules from the carrier gas as the gas outlet means is closed, continuously new and colder coal particles contact the hot tube wall, so that the conveying method according to the invention simultaneously functions as an essential measure for the rapid heating of the entire coal contents in the reaction tube.

DESCRIPTION OF THE PREFERRED EMBODIMENT FOR PRACTICING THE METHOD ACCORDING TO THE INVENTION

Turning now to FIG. 1, there is shown a horizontally disposed reaction tube 1, to the charging end of which there is fixedly secured a gastight storage chamber 3 which holds a granular mass of water-containing raw brown coal or similar material to be gasified. Within the storage chamber 3 there is provided a charging device for introducing the raw material into the reaction tube 1. The charging device comprises a shovel 4 rotatable by a shaft 5 secured thereto and disposed in alignment or parallel with the axis of tube 1. The rotatable shaft 5 traverses the wall of the storage chamber 3 through a fluidtight bushing 6 to be driven externally by power means (not shown). Above the chamber 3 there is disposed a charging container 7 and a gastight dispensing wheel 8 for introducing the granular raw material into the chamber 3.

For providing the necessary heat for the treatment of the granular material in the reaction tube 1, the walls thereof are externally heated by a heat carrying medium passed through a heating chamber 20 surrounding the reaction tube 1 and comprising an outer casing 21 as well as an inlet port 22 and an outlet port 23 for the admission and withdrawal of a heating medium.

At the downstream or outlet end of the reaction tube 1 there is provided a separation chamber 9 in which the residues 10 are accumulated subsequent to the gasification process. The container 9 may be downwardly emptied by a gas-tight dispensing wheel 11. From the chamber 9 there also extends a gas conduit 12 through which the gas generated in the reaction tube 1 may be taken out. In order to maintain the pressure in the gasification system at a desired value, the gas conduit 12 is provided with an adjustable outlet valve 13. From the chamber 9 there extends a further gas conduit 15 in which there is disposed a fluid discharge valve 14 which, according to the invention, is periodically opened and closed. When the discharge valve is closed, at least one part of the conveyed granular mass will settle in the entire reaction tube as indicated at 16 in the tube portion 1a. When the fluid discharge valve 14 is opened, the gas flow in the reaction tube 1 resumes with an initial, spontaneous thrust in the direction of the receiving container 9. In this manner the settled coal is rendered turbulent and is thus vigorously stirred. The granular material is illustrated in this turbulent condition in tube portion 1b and is given the reference numeral 17.

Figure 2:
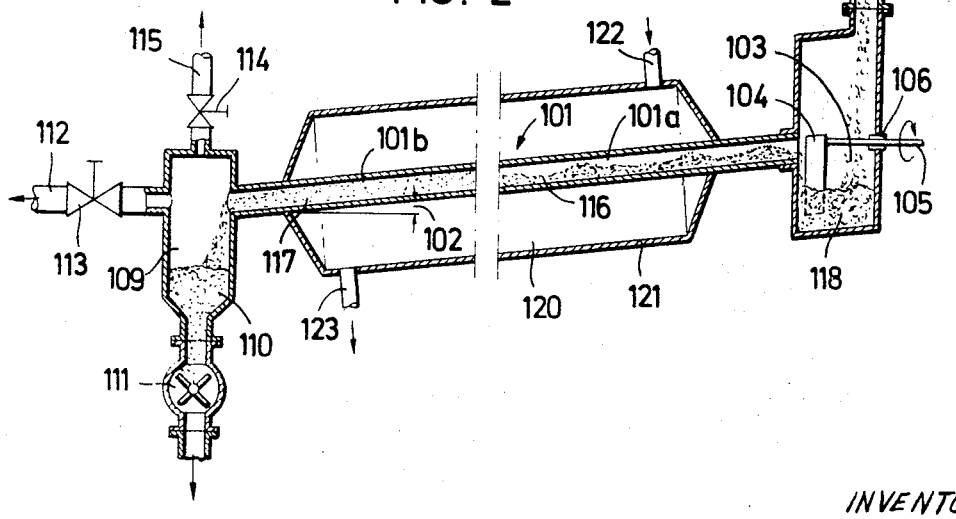

Turning now to FIG. 2, the apparatus shown therein differs from FIG. 1 only in that the reaction tube slopes downward in the downstream direction. It is noted that the components corresponding to those shown in FIG. 1 are designated with reference numerals increased by 100. The angle 102 which the reaction tube forms with the horizontal depends upon the size, shape and surface properties of the granules, the desired conveying speed thereof and the surface properties of the tube wall. The said angle is usually between 5° and 20° and is generally so adjusted that in the absence of a flow of the carrier fluid, no spontaneous sliding of the granular mass occurs. Such spontaneous sliding is disadvantageous since, in the first place, it cannot be controlled and may easily lead to clogging of the tube and, secondly, it is not selective with regard to the grain sizes. Thus, the inclined positioning of the reaction tube aids, but does not cause the motion of the granular mass.

It is an advantage of the above-described horizontal or approximately horizontal, but non-rotary reaction tube structure that a gastight joint with the upstream and downstream chambers may be effected in a simple manner.

OPERATION OF THE PREFERRED EMBODIMENT

In the description that follows the reference numerals will be those of FIG. 1 and it is to be understood that the same reference numerals increased by 100 apply to the embodiment shown in FIG. 2.

The charging container 7 is filled, for example, with small-grain raw brown coal 19 of grain sizes between 0 and 5 millimeters. This granular mass is continuously or intermittently fed into the stroage chamber 3 by means of heated the dispensing wheel 8. By setting the dispensing wheel 8 to an appropriate feeding speed, there is maintained a raw coal layer 18 in the storage chamber 3. As the shovel 4 rotates, it dips into the coal layer 18 and feeds quantities thereof into the reaction tube 1. The tube walls heated by the heating medium flowing through heating chamber 20 heat the granular raw brown coal mass which, as a result, releases water vapor. The gas outlet valve 13 is so adjusted that in the entire gasification system which comprises the storage chamber 3, the reaction tube 1 and the separation chamber 9, the vapor pressure is adapted to exceed a value of approximately 2 kg/cm². As soon as this pressure is reached during the course of a pressure buildup, the discharge valve 14 is automatically opened to provide, for a short period of time, a flow passage section of such an extent that a rapid drop of the gas pressure occurs in the system as the gas escapes through the open valve 14 and the outlet conduit 15. The depressurization of the separation chamber 9 causes a gas thrust along the reaction tube 1 in the direction of the chamber 9. By virtue of the gas surge, the granular coal which has settled in the reaction tube 1 in the absence of a carrier gas flow, is stirred and conveyed in the direction of the separation chamber 9. Thus, the vapor, escaping through the open discharge valve 14, functions as a carrier fluid as it displaces the granular mass in the reaction tube 1. When due to the release of the vapor through the discharge valve 14, the pressure in the separation chamber 9 drops to a value of for example 0.2 kg/cm², the discharge valve 14 is closed. In this manner the gas flow in the direction of the discharge end of the reaction tube 1 is again decreased so that the granular coal or the granular residues thereof may again settle in the tube as the gasification process progresses. As soon as the discharge valve 14 is closed, again a pressure buildup takes place and again, upon reaching the predetermined pressure value of, for example, 2 kg/cm², the discharge valve 14 is opened and the aforedescribed cycle is repeated. The distance through which the carrier fluid displaces the material in the reaction tube during one cycle of fluid flow, depends on the magnitude of the pressure drop in the separation chamber 9 as well as on the duration of the open condition of the discharge valve 14 and thus on the duration of the initial surge. The invention permits different variations and adaptations to be effected in given processes. Such variations may particularly include the coal charging devices and the slag removing mechanisms.

A significant variant of the apparatus resides in dimensioning the storage chamber 3 in such a manner that the thrust of fluid from chamber 3 into the reaction tube 1 during the depressurization of the system contributes to the conveying of the material in the reaction tube. It is noted that with proper dimensioning of the coal charging device, during the phase of the pressure buildup in the reaction tube, one part of the water vapor obtained from the raw coal in the reaction tube flows towards the storage chamber 3 against the motion of the coal. Upon discharging the system as a result of opening the valve 14, one part of the vapor accumulated in the storage chamber 3 may be taken out from the system through a vapor outlet valve provided for this purpose at the upper portion of the storage chamber 3.

The utilization of the method and apparatus according to the invention in the gasification process of raw brown coal is particularly advantageous. The advantage lies particularly in the fact that with simple means and without complex equipment a very efficient gasification may be achieved with a wide selection of the heating media. The latter may be exhaust gases or may be molten metal heated by the coolant of a nuclear reactor.

It is another important advantage of the aforedescribed preferred embodiment that the carrier fluid does not have to be introduced from an external source: it is generated within the reaction tube and is constituted by the water vapors released by the brown coal upon heating. It is to be understood that in addition to or instead of the water vapor generated during the gasification process, a carrier fluid taken from an external source and introduced into the reaction tube may also be used.

That which is claimed is:

1. In a method for conveying granular material through a horizontal or slightly inclined tube by means of a carrier fluid flowing therethrough, the improvement comprising the steps of: heating at least a portion of the external wall of said tube thereby subjecting said material to a heat treatment; and periodically varying the speed of said fluid between a high speed level and a low speed level, at least a substantial part of said material settles in said tube during the low-speed fluid flow and at least a substantial part of said material is conveyed by said fluid during the high-speed fluid flow.

2. A method as defined in claim 1, wherein the variation of the fluid speeds is effected by periodically interrupting the inflow of said fluid into said tube.

3. A method as defined in claim 1, including the step of causing said fluid to being each high-level speed period with an initial thrust.

4. In a method for conveying granular material through a horizontal or slightly inclined tube by means of a carrier fluid flowing therethrough, the improvement comprising the step of: periodically varying the speed of said fluid between a high speed level and a low speed level by periodically interrupting the outflow of said fluid at a discharge end of said tube, at least a substantial part of said material settles in said tube during the low-speed fluid flow and at least a substantial part of said material is conveyed by said fluid during the high-speed fluid flow.

5. A method as defined in claim 4, wherein each interruption of said outflow is effected relatively slowly and each resumption of said outflow is effected relatively rapidly.

6. In a method for conveying granular material through a horizontal or slightly inclined tube by means of a carrier fluid flowing therethrough, the improvement comprising the step of: periodically varying the speed of said fluid between a high speed level and a low speed level by periodically interrupting the outflow of said fluid at a dischage end of said tube synchronously with a periodic interruption of the inflow of said fluid into said tube, at least a substantial part of said material settles in said tube during the low-speed fluid flow and at least a substantial part of said material is conveyed by said fluid during the high-speed fluid flow.

7. In a method for conveying granular material through a horizontal or slightly inclined tube by means of a carrier fluid flowing therethrough, the improvement comprising the steps of: periodically varying the speed of said fluid between a high speed level and a low speed level, at least a substantial part of said material settles in said tube during the low-speed fluid flow and at least a substantial part of said material is conveyed by said fluid during the high-speed fluid flow; and effecting a buildup of pressure of said fluid in said tube during each period of low-speed fluid flow, said pressure causing said fluid to resume each period of high-speed fluid flow with an initial thrust.

8. In a method for conveying granular material through a horizontal or slightly inclined tube by means of a carrier fluid flowing therethrough, the improvement comprising the steps of: periodically varying the speed of said fluid between a high speed level and a low speed level, at least a substantial part of said material settles in said tube during the low-speed fluid flow and at least a substantial part of said material is conveyed by said fluid during the high-speed fluid flow; and generating said carrier fluid within said tube by submitting said material to a heat treatment.

9. A method as defined in claim 8, wherein said carrier fluid is water vapor obtained from said material in said tube.

10. A method as defined in claim 9, wherein said material is water-containing coal, more particularly raw brown coal, said method including the step of heating said tube to temperatures for effecting a drying of said coal and its decomposition and gasification with water vapor.

11. An apparatus for conveying granular material by means of periodically varying the speed of a carrier fluid in the apparatus between a high speed level and a low speed level, comprising:

A. an approximately horizontal tube having an inlet and an outlet,
B. means for externally heating said tube,
C. fluidtight feeding means attached to said inlet end of said tube and
D. a closing means disposed downstream of said outlet of said tube, with the arrangement of elements (A) through (D) being such that at least a substantial part of the material settles in said tube during the low-speed fluid flow and at least a substantial part of the material is conveyed by said fluid during the high-speed fluid flow.

12. An apparatus as defined in claim 11, wherein said fluidtight feeding means includes a feeding screw.

13. An apparatus as defined in claim 11, wherein said closing means is formed as a gate for blocking the cross section of said tube.

14. An apparatus as defined in claim 11, wherein said tube extends linearly.

* * * * *